United States Patent
Wilcox et al.

(10) Patent No.: US 7,258,270 B2
(45) Date of Patent: Aug. 21, 2007

(54) COMPACT ELECTRONIC UNIT WITH DISPLAY

(76) Inventors: Clinton Wilcox, 13395 Bass Trail, Grass Valley, CA (US) 95945; Armen E. Kazanchian, 2345 Montrose Ave. #7, Montrose, CA (US) 91020

( * ) Notice: Subject to any disclaimer, the term of this patent is extended or adjusted under 35 U.S.C. 154(b) by 196 days.

(21) Appl. No.: 10/999,717

(22) Filed: Nov. 30, 2004

(65) Prior Publication Data

US 2006/0113377 A1 Jun. 1, 2006

(51) Int. Cl.
*G06K 5/00* (2006.01)
(52) U.S. Cl. ........................ 235/380; 235/486
(58) Field of Classification Search ............ 235/380, 235/451, 486, 487, 492; 345/105, 173
See application file for complete search history.

(56) References Cited

U.S. PATENT DOCUMENTS

| | | | |
|---|---|---|---|
| 4,887,161 A | 12/1989 | Watanabe et al. | |
| 5,534,921 A | 7/1996 | Sawanobori | |
| 5,777,903 A | 7/1998 | Piosenka et al. | |
| 5,841,878 A | 11/1998 | Arnold et al. | |
| 5,852,807 A * | 12/1998 | Skarbo et al. ................. | 705/7 |
| 5,936,542 A | 8/1999 | Kleinrock et al. | |
| 6,019,284 A | 2/2000 | Freeman et al. | |
| 6,160,788 A | 12/2000 | Kobayashi et al. | |
| 6,254,001 B1 | 7/2001 | Chan et al. | |
| 6,369,793 B1 | 4/2002 | Parker | |
| 6,616,052 B2 | 9/2003 | Tseng et al. | |
| 6,680,715 B2 | 1/2004 | Blotky et al. | |
| 6,724,427 B1 | 4/2004 | Fredlund et al. | |
| 6,856,353 B1 | 2/2005 | Misawa | |
| 7,050,039 B1 * | 5/2006 | McGloin et al. ............ | 345/105 |
| 2002/0019296 A1 | 2/2002 | Freeman et al. | |
| 2002/0138633 A1* | 9/2002 | Angwin et al. ............ | 709/229 |
| 2002/0144442 A1 | 10/2002 | Harasawa et al. | |
| 2003/0050999 A1 | 3/2003 | Charnoff | |
| 2003/0052865 A1* | 3/2003 | Miller ....................... | 345/173 |
| 2003/0205615 A1 | 11/2003 | Marappan | |
| 2004/0189850 A1 | 9/2004 | Chang | |
| 2005/0212944 A1 | 9/2005 | Guy | |
| 2006/0075231 A1* | 4/2006 | Yu et al. ..................... | 713/168 |

* cited by examiner

*Primary Examiner*—Steven S. Paik
(74) *Attorney, Agent, or Firm*—Alvin R. Wirthlin

(57) ABSTRACT

An electronic unit for storing and displaying information includes a case, a computer having storage capability for electronically storing information and a processor for generating display signals corresponding to the stored information. A display screen is mounted within the case and connected to the processor for receiving the display signals generated by the processor and for displaying the information. At least one depressible key is mounted within the case, and a battery supplies electrical operating power to the computer. In addition, the unit includes a battery-saving feature for shutting off power to the display screen following a preselected period of time between successive depressions of any of the keys, and the case has a front which measures no more than about 3.5 inches by 2.0 inches and has a thickness which is no more than about 0.039 inches.

19 Claims, 3 Drawing Sheets

COMPACT ELECTRONIC UNIT WITH DISPLAY

BACKGROUND OF THE INVENTION

This invention is concerned with an electronic device having a screen for displaying stored information to a user.

The amount of information which is normally printed upon a conventional business card is limited by the size of the card. At the same time, the size of a business card is normally limited to the size of a conventional wallet within which the business card is typically stored.

It would therefore be desirable to provide a device which is capable of containing much more information than is capable of being printed upon a conventional business card yet has a size which generally corresponds to that of a conventional business card (or credit card) so that the device can be conveniently stored in a conventional-sized wallet.

Accordingly, it is an object of the present invention to provide a new and improved unit having electronic storage capabilities within which information is stored and a display screen for displaying the stored information and wherein the unit is small enough to be stored within a conventional-sized wallet.

Another object of the present invention is to provide such a unit which is powered by a battery and embodies a battery-saving feature.

Yet another object of the present invention is to provide such a unit which has the capacity to accept and store information which have been downloaded therein from a personal computer.

Still another object of the present invention is to provide such a unit which is well-suited for storing and displaying information of the type which is normally printed upon a business card, but has other applications as well, such as displaying photographs which have been downloaded from a digital camera or displaying redeemable store coupons.

A further object of the present invention is to provide such a unit which is easy to use and effective in operation.

SUMMARY OF THE INVENTION

This invention resides in an electronic unit for storing and displaying information.

The unit includes a case having a front and computer means mounted within the case. The computer means includes storage means for storing information, processing means for generating display signals corresponding to the stored information, and display means including a display screen mounted within the front of the case and connected to the processing means for receiving the display signals generated by the processing means and for displaying the information.

In one embodiment of the invention, the front of the case is rectangular in shape and measures no more than about 3.5 inches by 2.0 inches.

In another embodiment of the invention, the unit includes a display screen mounted within the front of the case and connected to the processing means for receiving the display signals generated by the processing means and for displaying the information. At least one depressible key is mounted within the case and connected to the computer means for initiating a preselected operation thereby upon depression of the ENTER key, and a battery is provided for supplying electrical operating power to the computer means. Furthermore, the computer means includes a battery-saving means connected to the keys for shutting off power to the display screen following a preselected period of time between successive depressions of any of the keys.

In yet another embodiment, the unit includes timing means associated with the processing means for effecting a change in the displayed information following a preselected period of time or upon reaching a specific moment in time. Such a feature is particularly well-suited for automatically replacing displayed information relating to a first redeemable store coupon with information relating to a second store coupon upon reaching the date (or moment) of expiration of information relating to the first-displayed coupon.

DETAILED DESCRIPTION OF AN ILLUSTRATIVE EMBODIMENT

Figure 1:
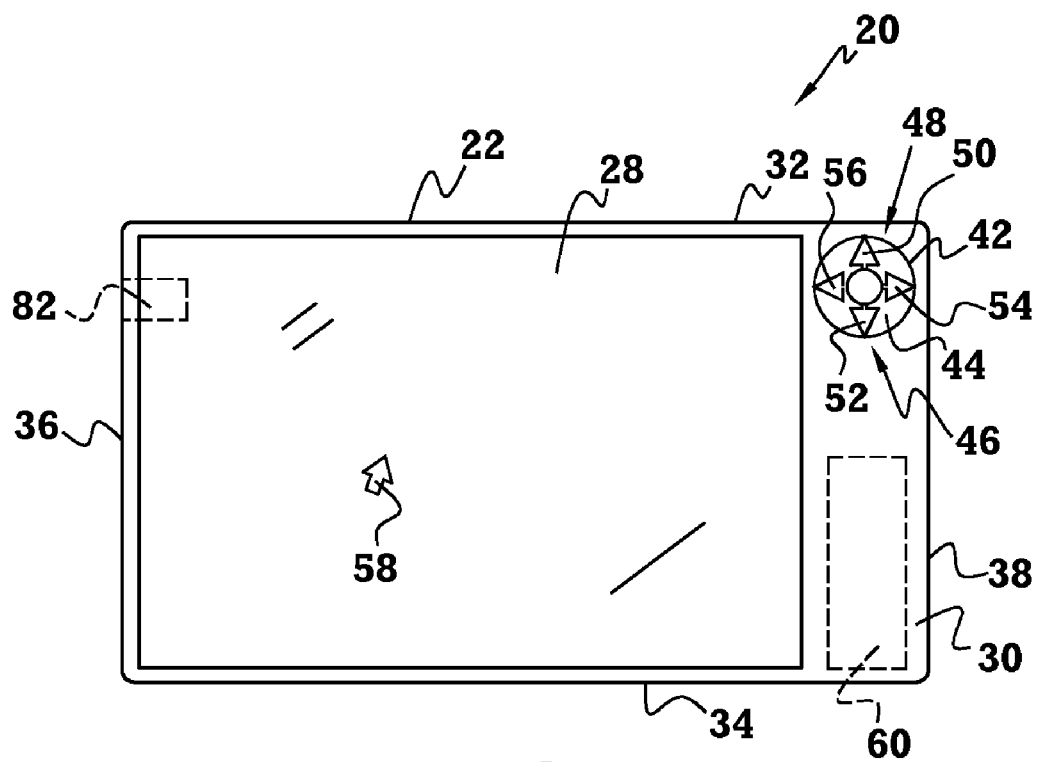
FIG. 1 illustrates in plan view one embodiment of an electronic display unit within which features of the present invention are incorporated.

Turning now to the drawings in greater detail and considering first FIG. 1, there is illustrated an embodiment, generally indicated 20, of an electronic unit within which features of the present invention are embodied. The unit 20 includes a case 22 within which is housed computer-related electronic components, described herein, for displaying to a user information which is stored within the components. The unit 20 is well-suited as a substitute for a paper business card (for displaying to a user the type of information which is normally printed upon a business card) and has the capabilities to display to a user the pages (e.g. of a company website) which are normally viewable on the world wide web. Accordingly, the unit 20 is expected to find relatively broad application in the realm of advertising, but other applications can be had.

Figure 2:
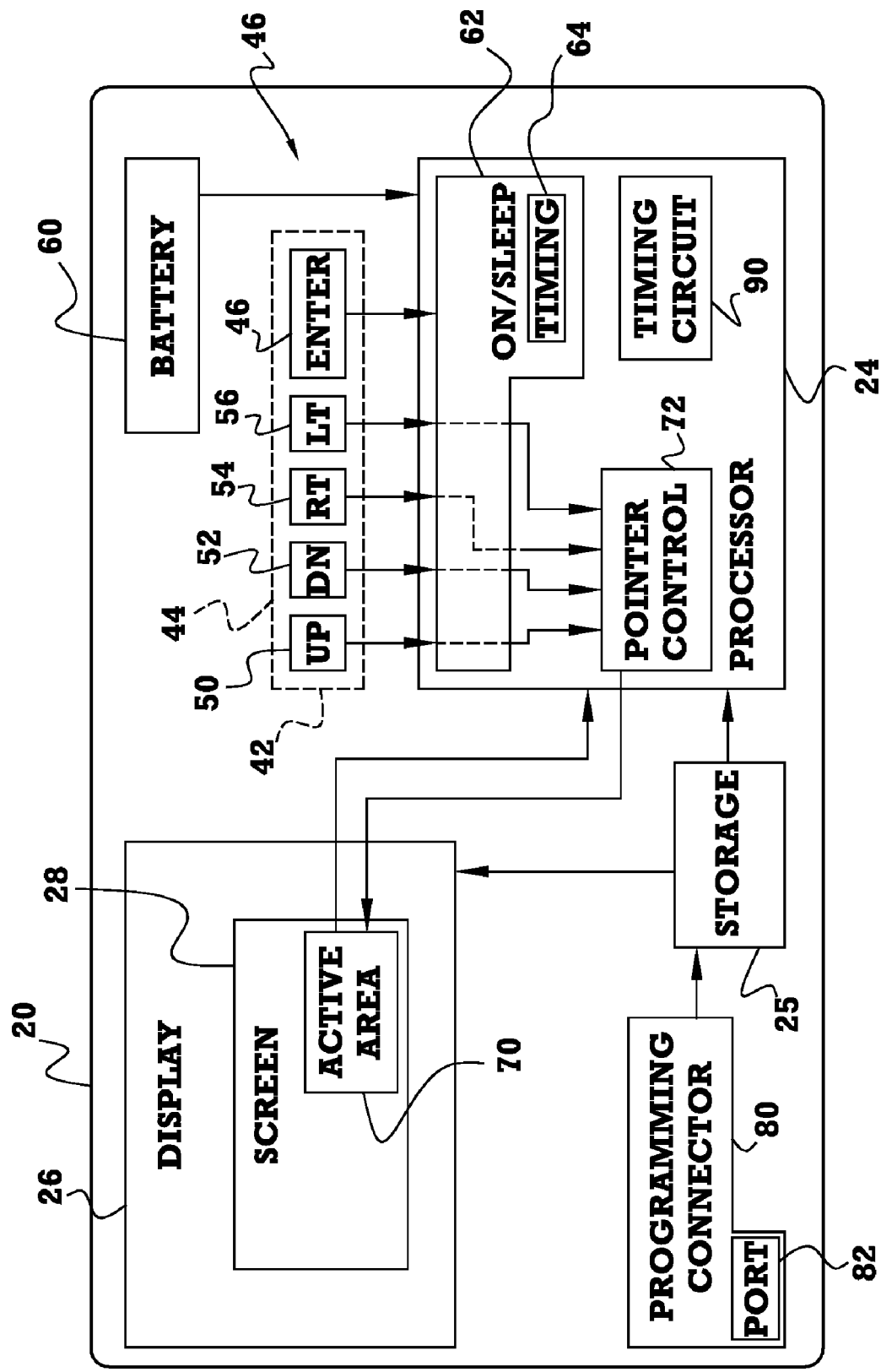
FIG. 2 is a block diagram illustrating the controls of the unit of FIG. 1.

Briefly and with reference to FIG. 2, the electronic components of the unit 20 includes computer processing means 24 mounted within the case 22 and memory storage means 25 which is appropriately connected to (i.e. interfaced with), the processing means 24. The unit also includes display means 26 including a display screen 28 mounted within the case 22. The processing means is a microcontroller which is appropriately connected between the display means 26 and the storage means 25 so that during use of the unit 20, the various operations of the unit 20 can be controlled by the processing means 24 while the memory storage means 25 stores information electronically. When appropriate command signals are sent from the processing means 24 to the storage means 25, stored information is sent to the display means 26 where it is displayed on the screen 28 to a user.

Figure 1A:
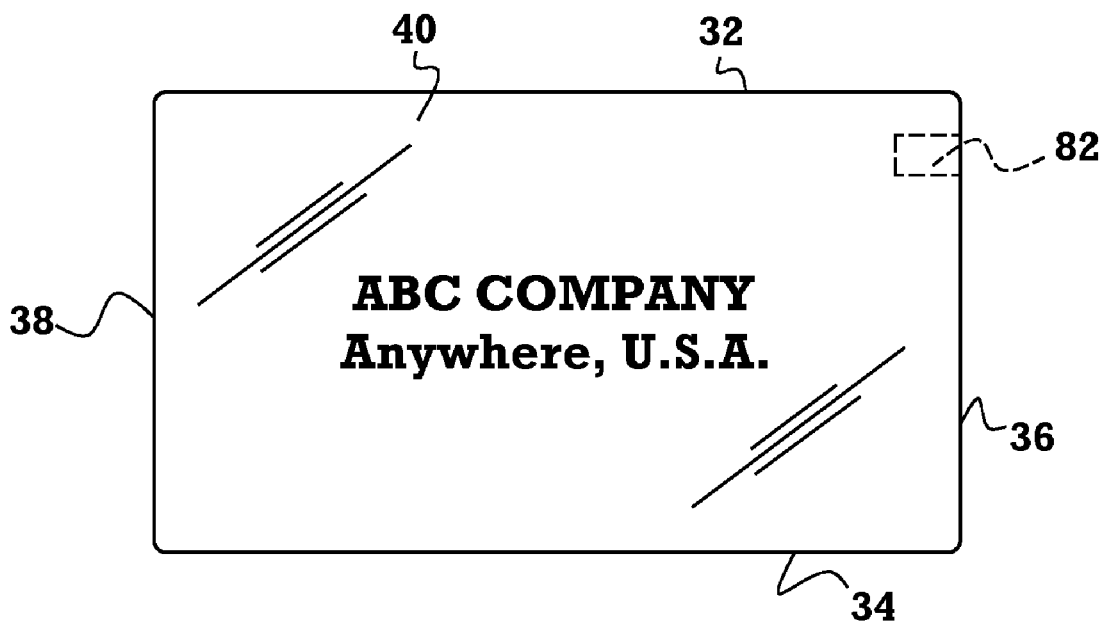
FIG. 1A illustrates in plan view the back of the FIG. 1 embodiment.

With reference again to FIG. 1, the case 22 is in the form of a shallow box (constructed, for example, of metal or a hard plastic material) including a front 30 (within which the display screen 28 is mounted), two opposite sides 32, 34, two opposite ends 36, 38 and a back 40. Preferably, the surface of the back 40, best shown in FIG. 1A, is adapted to bear indicia printed thereon, and such indicia can, for example, bear the name of a company whose identification information is stored within the storage means 25. The processing means 24 includes user entry means 42 including a keypad 44 which permits a user to manually enter various commands into the processing means 24 to initiate and perform selected functions. As illustrated, the keypad 44 includes navigation keys, generally indicated 46, comprising an UP key 50, a DOWN key 52, a RIGHT key 54 and a LEFT key 56 for controlling the positional relationship of a pointer 58 (FIG. 1) upon the display screen 28. As will be apparent herein, the user may desire to alter the position of the pointer 58 to, for example, effect the changing of a page being displayed on the screen 28. The keypad 44 further includes an ENTER key 46 which, when depressed, initiates a selected operation of the unit 20.

Exemplary dimensions of the case 22 are provided here as follows: The length and width of the case 22 (as measured across the front 30 thereof) are about 3.5 inches and about 2.0 inches, respectively, and the thickness of the case 22 (as measured between the front 30 and back 40 of the case 22) is about 0.039 inches (1.0 mm). To preserve the compact nature, or business card-size, of the unit 20, these provided dimensions are preferably maximum dimensions. Meanwhile, the length and width of the display screen 28 measure about 2.875 inches and about 1.875 inches, respectively.

The display screen 28 is a liquid crystal display (LCD) screen which is appropriately connected to the storage means 25 for receiving the information stored within the storage means 25 and the processing means 24 in a manner which permits communication between the storage means 25 and the processing means 24. For example, if the information displayed upon the display screen 28 includes an active area (e.g. an icon) which must be activated (by, for example, positioning the pointer 58 within the active area and subsequently depressing the ENTER key 46) to initiate the replacement of a displayed page of stored information by a subsequent page of stored information, the processing means 24 must be appraised that the active area of the screen 28 has been activated. Accordingly, the processing means 24 and the display means 26 are appropriately interfaced with one another.

In addition to the processing means 24 and display means 26, the unit 20 also includes a battery 60 mounted within the case 22 (and to one side of the screen 28 as illustrated in FIG. 1) for supplying power to the components of the unit 20 for performing the various functions, described herein, thereof. The battery 60 of the depicted unit 20 can be a rechargeable or non-rechargeable battery, and if, desired, can be a solar battery.

The depicted unit 20 does not include an ON/OFF switch and, accordingly, is intended to be ON from the moment that the processing means 24 is connected to the battery 60 for receiving operating power therefrom. However and insofar as the display screen 28 can present a substantial drain upon the available battery power, the processing means 24 includes a battery-saving means 62 (FIG. 2) appropriately connected between the keys of the keypad 44 and the display means 24 for placing the unit 20 in a SLEEP mode if none of the keys of the keypad 44 are touched for a preselected period of time following a touching of any of the keys of the keypad 44. Within the depicted unit 20, the unit 20 is placed in a SLEEP mode by shutting off (by way of the processing means 24) the power to the display screen 28.

In other words, by depressing any one of the five keys 46, 50, 52, 54 or 56 of the keypad 44, the page of information which was last displayed upon the screen 28 becomes (again) viewable to the user, but if a preselected period of time passes before any of the keys of the keypad 44 are depressed again, the processing means 24 shuts the power off to the screen 28 to place the unit 20 in its SLEEP mode. Accordingly, the processing means 24 includes appropriate timing and comparison circuits 64 for monitoring the period of time between the subsequent depression of the keys and shutting off the power to the screen when the passage of time between successive depression of any of the keys of the keypad 44 exceeds a predetermined period (e.g. fifteen seconds). More particularly, a predetermined period of time is preprogrammed into these circuits 64, and these circuits 64 continually monitor the amount of time from the moment that a key of the keypad 44 was last touched and compares the amount of time to the preprogrammed period. When the monitored amount of time reaches the preprogrammed period, the SLEEP mode is initiated.

Figure 3:
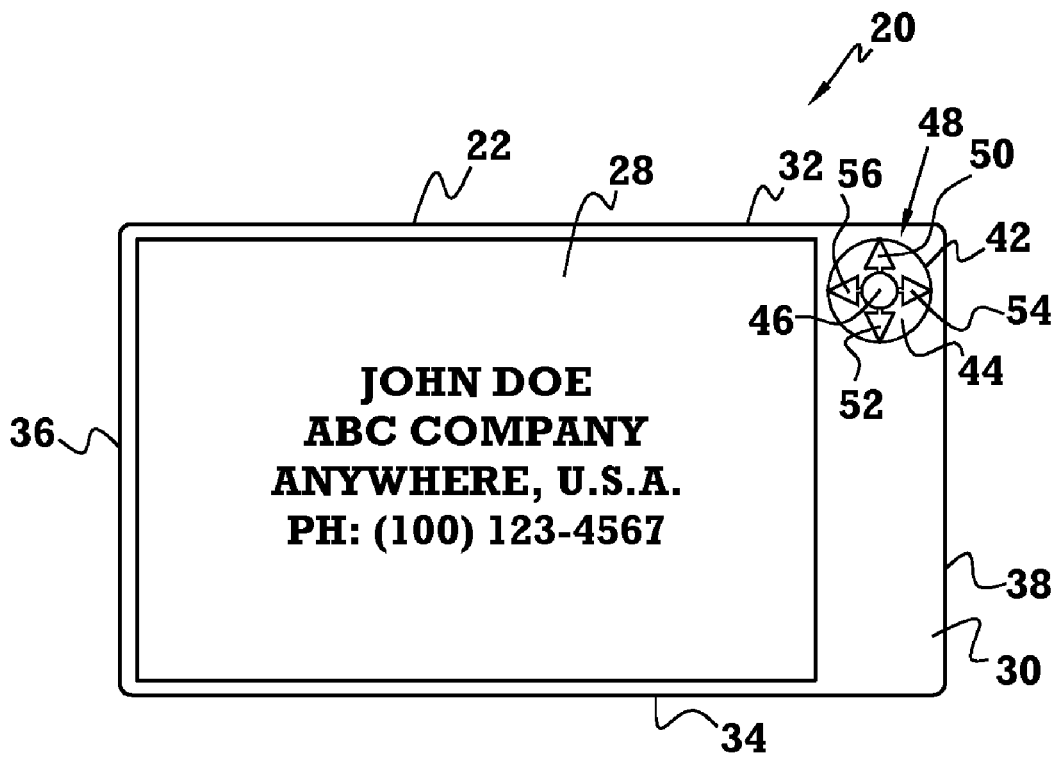
FIG. 3 is a view similar to that of FIG. 1 of the FIG. 1 unit illustrating upon its screen exemplary information which can be stored within the storage means of the unit.

The operation of the unit 10 will now be described with reference to FIG. 2 and in connection with two separate examples. In one example and with reference to FIG. 3, the stored information corresponds with the kind of information (including, for example, the name of an individual, his company and his telephone numbers) and is set forth on one page. As used herein, the term "page" of information is the information which is viewable on the display screen 28 at any one instant of time. Therefore, if the information stored within the storage means 25 amounts to one page of information (as shown in FIG. 3), then the entirety of the stored information is viewable on the screen 28 at any point in time.

In this first example, therefore, the amount of information stored within the storage means 25 is a relatively limited amount of information comprising, for example, an individual's name, company name, mailing address and telephone number. Therefore and as long as the power is supplied to the processing means 24 from the battery 60, this information is transmitted from the storage means 25 to the screen 28 where it is displayed for viewing by a user. Assuming that the unit 20 is initially in its battery-saving (i.e. SLEEP) mode (wherein power to the screen 28 is shut off), the depression of any of the keys 46, 50, 52, 54 or 56 of the keypad 44 re-initiates power to the screen 28 so that the information is again displayed on the screen 28.

It follows that in this first example, the navigation keys 50, 52, 54 or 56 can be used to initiate (or re-initiate) the display of stored information on the display screen 28, the navigation keys are ineffective to alter or change the displayed information on the screen 28.

Figure 4:
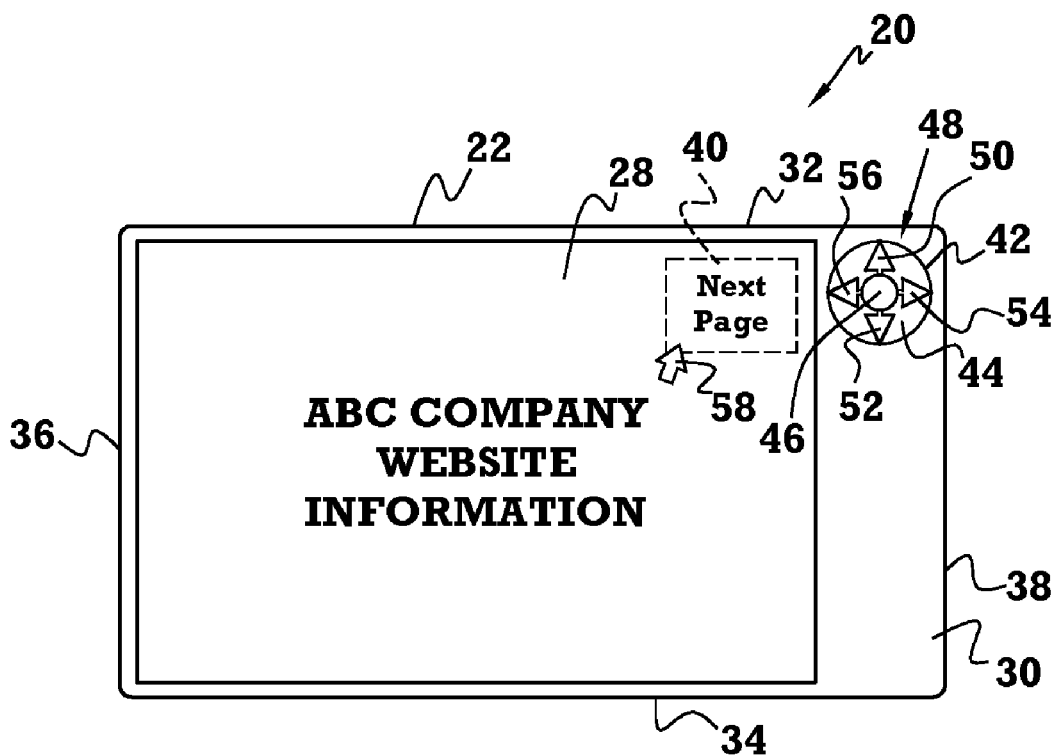
FIG. 4 is a view similar to that of FIG. 1 of the FIG. 1 unit illustrating upon its screen other exemplary information which can be stored within the storage means of the unit.

In a second example and with reference to FIGS. 2 and 4, the information stored within the storage means 25 includes multiple pages of information—meaning that the stored information is more information than can be displayed on the screen 28 at any one time. Moreover, the multiple pages of information are pre-programmed (within the storage means 25) so that when ultimately displayed upon the screen 28, the pages of information are displayed in a preprogrammed sequence. In other words and because of the sequence in which the pages of information are programmed to be displayed, a second page of prescribed information will always follow a first page of prescribed information, a third page of prescribed information will always follow a second page of prescribed information, and so on.

Furthermore, the display screen 28 embodies at least one active area, indicated 70 in FIG. 4, which enables a user to replace a page of information being displayed upon the screen 28 with a subsequent page of information. In this connection and within this second example, the active area 70 of the screen 28 includes a "Next Page" icon enabling the user to replace the page being displayed upon the screen 28 with the next page of information in the pre-programmed sequence of pages by moving the pointer 58 (FIGS. 1 and 4) by means of the navigation keys 50, 52, 54 or 56 and pointer control means 72 until the pointer 58 overlies the active area 70 and then the ENTER key 46 is depressed. Once depressed, the ENTER key 46 initiates a processor-generated command that the next page of information (in the preprogrammed sequence of information) replace the page of information being displayed upon the screen 28.

It will be understood that the active area 70 displayed upon the screen 28 is the result of appropriate pre-programming within the stored information (contained within the storage means 25) so that when a predetermined page of information is displayed upon the screen 28, the active area 70 appears upon the screen 28 along with the (remainder of the) predetermined page of information.

Therefore, from the moment that power is first supplied to the processing means 25, signals are transmitted from the storage means 25 to the screen 28 for displaying upon the screen 28 the information of a first page (in the pre-programmed sequence of pages) of information to a user. Within this first displayed page of information, an active area 70 (i.e. a "Next Page" icon) is embodied which enables the user to replace the displayed page appearing upon the screen 28 with the next page (of the preprogrammed sequence of pages) of stored information. In this connection, the processing means 24 includes the pointer control means 72, introduced earlier, which provides the movable pointer 58 (i.e. the small arrow illustrated in FIGS. 1 and 4) which is visible upon the screen 28 and whose position can be altered upon the screen 28 by depression of the various navigation keys 50, 52, 54 and 56 of the keypad 44. In use, the pointer 58 is moved (by way of the navigation keys) until the pointer overlies the active area 70 (i.e. a "Next Page" icon) of the screen 28, and then the ENTER key 46 of the keypad 44 is depressed so that the processing means 24 replaces the page of information being displayed upon the screen 28 with the next page (in the next page in the pre-programmed sequence of pages) of the stored information. Repeated depression of the ENTER key 46 while the pointer 58 overlies the active area 70 of the displayed screen of information effects the sequential displaying of the subsequent pages of information upon the screen 28.

It will also be understood that since the unit 20 in this second example includes the aforedescribed battery-saving means 62, the unit 20 switches to a SLEEP mode if a preselected period of time passes between sequential depressions of any of the keys of the keypad 44.

It is also a feature of the unit 20 that it includes interface means, indicated 80 in FIG. 2, through which information is downloaded into the storage means 25. In this connection, the interface means 80 includes a port 82 which is electrically connected to the storage means 25 and through which information which is desired to be stored within the storage means 25 is conducted to the storage means 25. Assuming that the storage means 25 is compatible with the format of information which is stored within the file of a personal computer (PC), PC-stored information can be downloaded from the PC into the storage means 25. For example, if website information from the world wide web can be copied, or placed, in a file within a PC, and that file can be copied within the storage means 25 for ultimate display upon the screen 28. Therefore, information pertaining to a company's website and which can be copied to a file could be downloaded from that file and copied (i.e. stored) within the storage means 25 for ultimate display upon the display screen 28. This same capability enables photographs to be downloaded into the storage means 25 from, for example, a digital camera for display upon the screen 28.

It will be understood that numerous modifications and substitutions can be had to the aforedescribed embodiment without departing from the spirit of the invention. For example, additional timing means (depicted in FIG. 2 as a timing circuit 90) can be incorporated within the processing means 24 for effecting a change in the information being displayed upon the screen 28 following a preselected period of time or upon reaching a specific moment in time. In this connection, the information stored within the storage means 25 can relate to two redeemable store coupons, while the information relating to a first of such coupons is displayed upon the screen 28. Meanwhile, the timing circuits 90 monitor the length of time (e.g. in days or months) since the coupon-related information was downloaded into the storage means 25 and automatically replaces the displayed information relating to the first of such coupons with information relating to the second of such coupons following the passage of a preselected period of time.

In the alternative, the timing circuits 90 can be preprogrammed to effect the replacement of the coupon-related information being displayed upon the screen 28 with alternative coupon-related information when a specific moment in time (e.g. a specific calendar date) is reached. This latter-described feature is advantageous in that it facilitates the automatic display of fresh (e.g. unexpired) coupon-related information when the previously-displayed coupon-related information reaches a time (or date) of expiration.

Accordingly, the aforedescribed embodiment is intended for the purpose of illustration and not as limitation.

The invention claimed is:

1. A compact electronic unit for storing and displaying information, the unit comprising:
   a case;
   a computer mounted within the case including:
      a storage for storing first and second display information; and
      a processor for generating first display signals corresponding to the stored first display information;
   a display including a display screen mounted within the case and connected to the processor for receiving the first display signals generated by the processor and for displaying the first display information; and
   a timing circuit operably associated with the processor for monitoring an expiration date of the first display information, the processor being operable to replace the first display information with the second display information when the expiration date has been reached, and generate second display signals based on the second display information for displaying the second display information on the display screen;
   a time between displaying the first and second display information being greater than that required to display sequential images in a motion picture effect.

2. The unit as defined in claim 1 wherein the case is rectangular in shape having a length which is no more than about 3.5 inches and a width which is no more than about 2.0 inches and the display screen is rectangular in shape and has sides which measure no more than about 1.875 inches by 2.875 inches.

3. The unit as defined in claim 2 wherein the case has a thickness which is no more than about 0.039 inches.

4. The unit as defined in claim 1 further including at least one pressure sensitive key mounted within the case and connected to the computer for initiating a preselected operation upon depression of the at least one pressure sensitive key, the unit includes a battery for supplying electrical operating power to the computer, and the computer includes battery-saving means connected to the at least one pressure sensitive key for shutting off power to the display screen following a preselected period of time between successive depressions of any of the at least one pressure sensitive keys.

5. The unit as defined in claim 4 wherein the battery-saving means includes:
means containing stored information relating to the preselected period of time,
means for monitoring the time from a depression any of the at least one depressible keys; and
means for comparing the monitored time to the preselected period of time so that when the monitored time reaches the preselected period of time before any of the at least one depressible keys are again depressed, the power to the display screen is shut off.

6. The unit as defined in claim 1 wherein the storage is adapted to accept information downloaded therein from an external source, and
the unit further includes a port through which the information can be downloaded from the external source to the storage.

7. The unit as defined in claim 1 wherein the case has a front for viewing the display screen and a back including a surface which is adapted to bear indicia printed thereon.

8. A compact electronic unit for storing and displaying information, the unit comprising:
a case
a computer mounted within the case including:
a storage for storing first and second display information: and
a processor for generating first display signals corresponding to the stored first display information;
a display including a display screen mounted within the case and connected to the processor for receiving the first display signals generated by the processor and for displaying the first display information;
a timing circuit operably associated with the processor for monitoring an expiration date of the first display information, the processor being operable to replace the first display information with the second display information when the expiration date has been reached, and generate second display signals based on the second display information for displaying the second display information on the display screen;
the computer including means providing a user-controlled pointer which is viewable upon the display screen;
a set of depressible navigation keys mounted within the case and connected to the control means enabling a user to alter the position of the displayed pointer across the screen and a depressible ENTER key mounted within the case and connected to the computer means for initiating a preselected operation thereby upon depression of the ENTER key, and
the display screen including an active area over which the displayed pointer can be positioned and through which the preselected change in the displayed information is initiated so that by positioning the displayed pointer over the active area and depressing the ENTER key, the preselected change in the displayed information is effected.

9. The unit as defined in claim 8 wherein the navigation keys includes four keys for controlling the upward movement of the pointer relative to the front of the screen, the downward movement of the pointer relative to the front of the screen, the rightward movement of the pointer relative to the front of the screen, and the leftward movement of the pointer relative to the front of the screen.

10. A compact electronic unit for storing and displaying information, the unit comprising:
a case;
a computer mounted within the case including:
a storage device for storing information; and
a processor for generating display signals corresponding to the stored information;
a display including a display screen mounted within the case and connected to the processor for receiving the display signals generated by the processor and for displaying the information;
at least one pressure sensitive key mounted within the case and connected to the computer for initiating a preselected operation thereof upon depression of the at least one pressure sensitive key;
a battery for supplying electrical operating power to the computer and the display screen for displaying the information;
the computer including a battery saving means connected to the at least one pressure sensitive key for shutting off power to the display screen following a preselected period of time between successive depressions of any of the at least one pressure sensitive keys;
a user-controlled pointer which is displayed on the display screen;
the at least one pressure sensitive key including a set of navigation keys mounted within the case and connected to the processor enabling a user to alter the position of the displayed pointer across the screen and an ENTER key mounted within the case and connected to the processor enabling the user to initiate a preselected change in the displayed information by depressing the ENTER key; and
the display screen including an active area over which the pointer can be positioned and through which the preselected change in the displayed information is initiated so that by positioning the pointer over the active area and depressing the ENTER key, the preselected change in the displayed information is effected.

11. The unit as defined in claim 10 wherein the case has a front which is rectangular in shape and has sides extending from the front which measure no more than about 3.5 inches by 2.0 inches.

12. The unit as defined in claim 11 wherein the display screen is rectangular in shape, and the sides of the display screen measure no more than about 1.875 inches by 2.875 inches.

13. The unit as defined in claim 11, wherein the case has a thickness which is no more than about 0.039 inches.

14. The unit as defined in claim 11, wherein the case has a back including a surface which is adapted to bear indicia printed thereon.

15. The unit as defined in claim 10, wherein the battery-saving means includes:
means containing stored information relating to the preselected period of time;
means for monitoring the time from the most recent depression any of the at least one depressible keys; and
means for comparing the monitored time to the preselected period of time so that when the monitored time reaches the preselected period of time before any of the at least one depressible keys are again depressed, the power to the display screen is shut off.

16. The unit as defined in claim 10 wherein the set of navigation keys includes four keys for controlling the upward movement of the pointer relative to the front of the screen, the downward movement of the pointer relative to the front of the screen, the rightward movement of the pointer relative to the front of the screen, and the leftward movement of the pointer relative to the front of the screen.

17. The unit as defined in claim 10 further comprising a timing circuit associated with the processor for effecting a change in the displayed information following a preselected period of time or upon reaching a specific moment in time.

18. A portable electronic unit for storing and displaying information, the unit comprising:

a case;

a memory located within the case for storing display information corresponding to a plurality of images;

a processor located within the case and operably connected to the memory for generating display signals corresponding to the stored display information;

a display screen mounted in the case and operably connected to the processor for receiving the generated display signals and for displaying the plurality of images, the display screen having an active area displaying at least one icon that remains viewable during display of the plurality of images, the at least one displayed icon representing a user selectable choice of an image to be displayed; and at least one pressure sensitive key located on the case separate from the display screen and operably connected to the processor for selecting the at least one displayed icon to thereby change an image to be displayed.

19. A portable electronic unit according to claim 18, wherein the at least one pressure sensitive key includes four navigation keys equally spaced about a 360 degree circle and an ENTER key centered between the navigation keys.

* * * * *